(12) United States Patent
Harada

(10) Patent No.: US 6,856,583 B2
(45) Date of Patent: Feb. 15, 2005

(54) OPTICAL DISK PLAYER

(75) Inventor: Takashi Harada, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 63 days.

(21) Appl. No.: 10/453,512

(22) Filed: Jun. 4, 2003

(65) Prior Publication Data

US 2003/0227843 A1 Dec. 11, 2003

(30) Foreign Application Priority Data

Jun. 6, 2002 (JP) ........................................ 2002-165158

(51) Int. Cl.$^7$ ............................................. G11B 21/08
(52) U.S. Cl. ................................. 369/30.23; 369/47.33
(58) Field of Search .......................... 369/30.23, 30.24, 369/30.03, 30.18, 30.27, 47.33, 47.32, 47.34

(56) References Cited

U.S. PATENT DOCUMENTS

| | | | | | |
|---|---|---|---|---|---|
| 5,590,101 A | * | 12/1996 | Itoi | ........................ | 369/30.23 |
| 5,659,528 A | * | 8/1997 | Kojima et al. | ........... | 369/30.23 |
| 5,699,336 A | * | 12/1997 | Maeda et al. | ............ | 369/30.23 |
| 5,748,585 A | * | 5/1998 | Tsukamoto et al. | ...... | 369/47.23 |
| 5,815,472 A | * | 9/1998 | Kuroda et al. | ........... | 369/47.33 |
| 5,881,031 A | * | 3/1999 | Asano et al. | .............. | 369/30.1 |
| 6,018,506 A | * | 1/2000 | Okabe et al. | ............. | 369/30.23 |
| 6,317,809 B1 | * | 11/2001 | Kulakowski et al. | ....... | 711/112 |
| 6,538,962 B2 | * | 3/2003 | Hyun | ...................... | 369/30.23 |
| 6,594,203 B2 | * | 7/2003 | Ueki | ....................... | 369/32.01 |
| 6,731,577 B2 | * | 5/2004 | Suzuki | .................... | 369/47.33 |

FOREIGN PATENT DOCUMENTS

JP       2001-338423 A  * 12/2001  .............. 369/30.23

* cited by examiner

*Primary Examiner*—Tan Dinh
(74) *Attorney, Agent, or Firm*—Birch, Stewart, Kolasch & Birch, LLP

(57) ABSTRACT

The optical disk player is capable of correctly restarting to write data. Data protection means returns an optical pick-up from an interruption address to a synchronization starting address. The data protection means reads data from the synchronization starting address to the interruption address at a reading velocity equal to a former writing velocity. The data protection means restarts writing data from the interruption address if a phase of data read is synchronized with a phase of data to be written. The data protection means returns the optical pick-up to the synchronization starting address and reads data from there to the interruption address at a reading velocity slower than the former writing velocity so as to synchronize the phases if the synchronization is failed.

3 Claims, 7 Drawing Sheets

OPTICAL DISK PLAYER

BACKGROUND OF THE INVENTION

The present invention relates to an optical disk player, more precisely relates to an optical disk player, which is capable of restarting to write data from an interruption address even if writing data is once interrupted.

In an optical disk player, data are written on an optical disk. These days, a velocity of writing data on the optical disk is made higher and higher, so that a velocity of transferring data to be written from a host computer to the optical disk player is often slower than the velocity of writing data. This phenomenon is called "buffer under-run".

In the conventional optical disk player, if writing data is interrupted by buffer under-run, the optical disk cannot be used any longer.

To solve the problem caused by buffer under-run, recently many optical disk players have data protection means so as to prevent producing useless disks.

The data protection means will be explained. When the buffer under-run occurs, the data protection means interrupts writing data and stands by for a while. Then, if a data transferring velocity is accelerated or enough amount of data to be written are stored in a buffer memory, the data protection means restarts writing data.

Therefore, the data protection means can prevent producing useless optical disks even if the buffer under-run occurs.

In the optical disk player having the data protection means, rotation of the optical disk must be synchronized with timing of writing data before restart of writing data so as to securely write data from an interruption address, at which writing data has been interrupted.

Next, the synchronization by the data protection means will be explained. Firstly, the data protection means returns an optical pick-up to a position, whose address is prior to the interruption address, and reads the written data at a reading velocity, which is equal to the writing velocity before the interruption, so as to get EFM (Eight to Fourteen Modulation) signals. Further, the data protection means generates EFM signals for writing data in an encoder and synchronizes the two.

Next, a conventional zone CLV type optical disk player will be explained.

In many conventional optical disk players, data are written on an optical disk by a CLV (Constant Linear Velocity) manner, in which a linear velocity for writing data is fixed. Therefore, the rotation of the optical disk is controlled to write data with fixed pit density.

In the CLV optical disk player, the linear velocity is fixed, so that a rotational speed of the optical disk is made faster when data are written in an inner part of the optical disk; the rotational speed of the optical disk is made slower when data are written in an outer part of the optical disk.

These days, a required data writing velocity is much higher than that of the conventional optical disk players. In the CLV type optical disk player, if the linear velocity is merely accelerated, the rotational speed of the optical disk for writing data in an inner part is too fast to securely write data.

To solve the problem, the zone CLV type optical disk player, which is capable of shortening time for writing data without accelerating the rotational speed of the optical disk for writing data in the inner part, has been produced.

In the zone CLV type optical disk player, data are written in an inner zone of the optical disk at a low constant linear velocity; the linear velocity for writing data is accelerated by stages when the optical pick-up transfers to outer zones to write data therein. Therefore, total time for writing data in the whole optical disk can be shortened.

In the zone CLV type optical disk player too, when the linear velocity is changed, writing data is once interrupted and rotation of the optical disk must be synchronized with timing of writing data before restart of writing data so as to securely write data at higher writing velocity, as well as the data protection means for solving the problems caused by buffer under-run.

Next, the synchronization by zone CLV control means will be explained. The zone CLV control means returns an optical pick-up to a position, whose address is prior to the interruption address, and reads the written data at a writing velocity for next zone, which is faster than the writing velocity before the interruption, so as to get EFM signals. Further, the zone CLV control means generates EFM signals for writing data in an encoder and synchronizes the two.

However, if quality of written data is low due to high writing velocity, correct EFM data patterns cannot be read when the written data are read, so that the rotation of the optical disk and the timing of data to be written cannot be synchronized.

If the synchronization is failed when writing data is restarted, data cannot be written on the optical disk, so that the disk finally becomes a useless disk.

In that case, even if writing data can be restarted, new data cannot be correctly written with respect to the former written data.

SUMMARY OF THE INVENTION

An object of the present invention is to provide an optical disk player, which has data protection means or zone CLV control means and which is capable of securely synchronizing with an optical disk and correctly restarting to write data.

To achieve the object, the present invention has following structures.

Namely, the optical disk player of the present invention comprises:

an optical pick-up irradiating laser beams toward an optical disk while reading data from and writing data on the optical disk, the optical pick-up being moved along a pregroove of the optical disk so as to read data from and write data on the optical disk;

means for moving the optical pick-up so as to read data from and write data on the optical disk;

a spindle motor for rotating the optical disk;

means for servo-controlling the moving means and the spindle motor so as to read and write data at prescribed velocities; and data protection means interrupting to write data when buffer under-run occurs, the data protection means restarting to write data when a data transferring velocity is accelerated or enough amount of data to be written are stored in a buffer memory, in which data are temporally stored before writing, after the interruption of writing data, wherein the data protection means controls the servo-controlling means to inwardly return the optical pick-up from an interruption address, at which writing data has been interrupted, to a synchronization starting address along the pregroove, in which data have been written, the data protection means controls the servo-controlling means to read data from the synchronization starting address to the interruption address at a reading velocity, which is equal to the writing velocity before the interruption, the data protection means controls the servo-controlling means to restart writing data from the interruption address if a phase of data read is synchronized with a phase of data to be written, and the data protection means controls the servo-controlling means to return the optical pick-up to the synchronization starting address and read data from the synchronization starting address to the interruption address at a reading velocity slower than the writing velocity before the interruption so as to synchronize the phase of data read with the phase of data to be written if the phase of data read is not synchronized with the phase of data to be written.

In the optical disk player, when the data protection means restarts writing data, the optical pick-up is returned, then the data protection means tries to synchronize the rotation of the optical disk with the writing velocity before the interruption so as to write data at the same writing velocity. If the synchronization is failed at the same writing velocity, the data protection means tries to synchronize at slower writing velocity. Therefore, producing useless disks can be prevented.

In the optical disk player, the data protection means may repeat the action for synchronizing the phase of data read with the phase of data to be written with reducing the reading velocity between the synchronization starting address and the interruption address until the phases are synchronized.

With this structure, reduction of the writing velocity is repeated until the phases are synchronized, so that writing data can be securely restarted.

Another optical disk player of the present invention comprises:

an optical pick-up irradiating laser beams toward an optical disk while reading data from and writing data on the optical disk, the optical pick-up being moved along a pregroove of the optical disk so as to read data from and write data on the optical disk;

means for moving the optical pick-up so as to read data from and write data on the optical disk;

a spindle motor for rotating the optical disk;

means for servo-controlling the moving means and the spindle motor so as to read and write data at prescribed velocities; and zone CLV control means controlling the servo-controlling means so as to change a writing velocity on the basis of zones of the optical disk, in which data are written, wherein the zone CLV control means controls the servo-controlling means to interrupt writing data when an address of written data reaches an velocity changing address, at which the writing velocity is changed, the zone CLV control means controls the servo-controlling means to inwardly return the optical pick-up from the velocity changing address to a synchronization starting address along the pregroove, in which data have been written, the zone CLV control means controls the servo-controlling means to read data from the synchronization starting address to the velocity changing address at a reading velocity, which is equal to a predetermined writing velocity of the next zone and which is faster than the writing velocity before the interruption, the zone CLV control means controls the servo-controlling means to restart writing data from the velocity changing address at the predetermined writing velocity if a phase of data read is synchronized with a phase of data to be written, and the zone CLV control means controls the servo-controlling means to return the optical pick-up to the synchronization starting address and read data from the synchronization starting address to the velocity changing address at the reading velocity, which is equal to the writing velocity before the interruption, so as to synchronize the phase of data read with the phase of data to be written if the phase of data read is not synchronized with the phase of data to be written at the predetermined writing velocity.

In the zone CLV type optical disk player, after the interruption of writing data, writing data is restarted at faster writing velocity, so the zone CLV control means tries to synchronize the rotation of the optical disk with the faster writing velocity. If the synchronization is failed at the faster writing velocity, the zone CLV control means tries to synchronize at the former slower writing velocity. By synchronizing with the former slower writing velocity, producing useless disks can be prevented.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

(First Embodiment)

Figure 1:
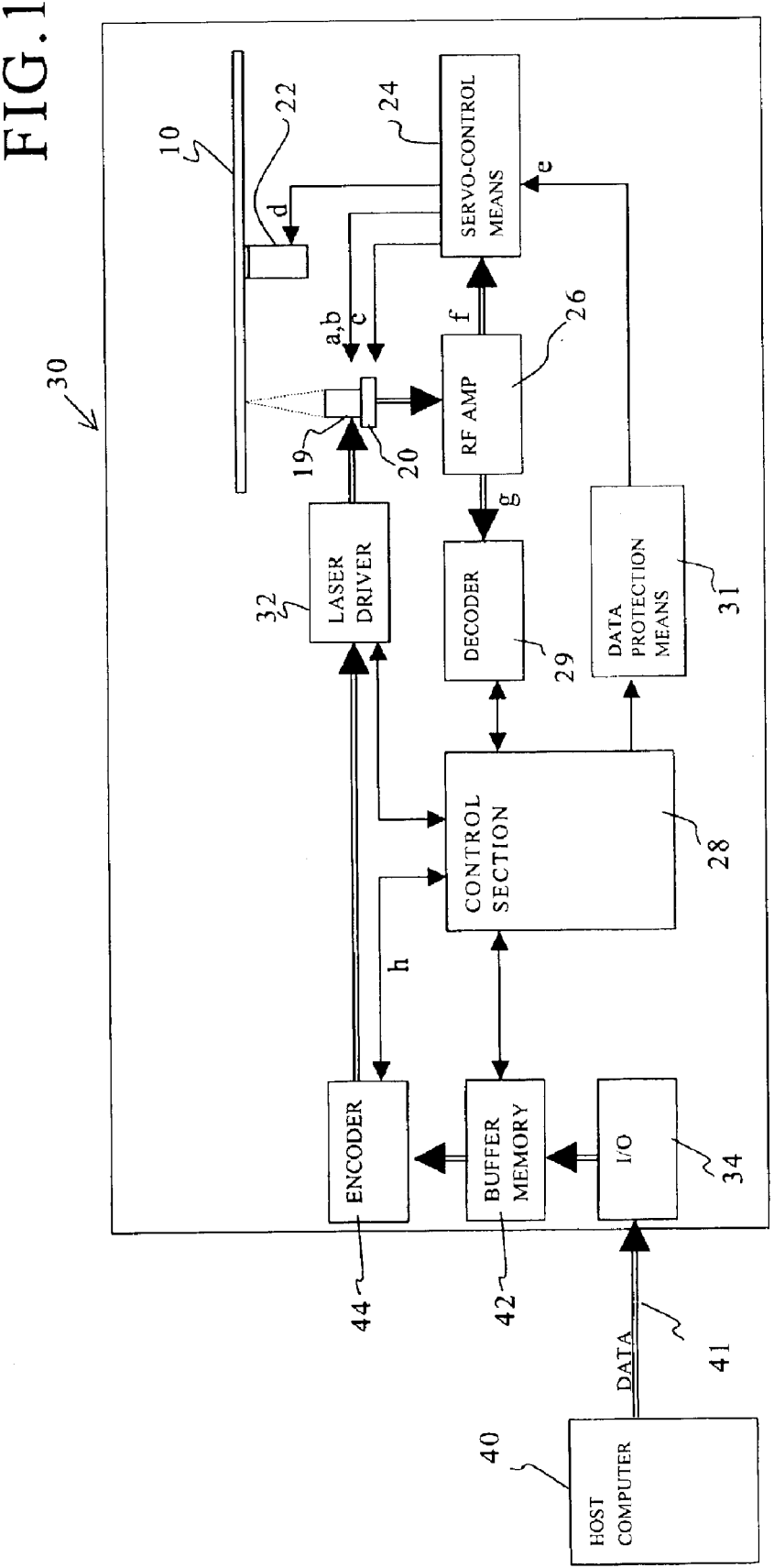
FIG. 1 is a block diagram of an optical disk player of a first embodiment of the present invention.

Firstly, a structure of an optical disk player of a first embodiment will be explained with reference to a block diagram shown in FIG. 1.

The optical disk player 30 has an optical pick-up 19, which includes a laser diode (not shown) irradiating laser beams toward an optical disk 10 and a photo detector (not shown) receiving laser beams reflected from the optical disk 10.

The optical pick-up 19 is moved in a tracking direction of the optical disk 10 by a moving mechanism 20. The moving mechanism 20 includes a thread shaft (not shown) for movably supporting the optical pick-up 19, a motor (not shown) for rotating the thread shaft, etc.

The optical disk 10 is mounted on a turn table, which is fixed to a rotary shaft of a spindle motor 22. Therefore, the spindle motor 22 rotates the optical disk 10.

Servo-controlling means 24 controls the spindle motor 22 for rotating the optical disk 10, tracking and focusing an object lens (not shown) assembled in the optical pick-up 19, and the moving mechanism 20. A servo processor is used as the servo-controlling means 24.

The servo-controlling means 24 servo-controls them on the basis of error signals "f", which are extracted from intensity signals of the laser beams reflected from the optical disk 10 by an RF amplifier 26, and control signals "e", which are sent from data protection means 31 controlled by a control section 28.

The servo processor 24 controls tracking and focusing of the object lens with control signals "a" and "b", controls the moving mechanism 20 with control signals "c" so as to move the optical pick-up 19 on the basis of address signals from the control section 28 and controls the rotation of the spindle motor 22 with control signals "d" from the servo-controlling means 24, which are generated on the basis of the error signals "f" from the RF amplifier 26 and the control signals "e" from the control section 28.

Note that, the servo-controls may be executed by one servo processor, or they may be executed by a plurality of servo processors respectively.

The optical disk player 30 is connected with a host computer 40 by cables 41 with an interface, e.g., SCSI, ATAPI.

When commands are inputted from the host computer 40, the optical disk player 30 starts operation. Usually, data to be written on the optical disk 10 are transferred from the host computer 40 to the optical disk player 30.

Date transferred from the host computer 40 are once stored in a buffer memory 42 via an input/output section 34. In the present embodiment, the buffer memory 42 is a DRAM having a capacity of 4 MB.

An encoder 44 encodes data stored in the buffer memory 42. A laser driver 32 controls intensity of the laser beams irradiated from the laser diode of the optical pick-up 19 when data are written on the optical disk 10.

Note that, data read from the optical disk 10 are decoded by a decoder 29, then the decoded data are sent to the input/output section 34 via another buffer memory (not shown), etc.

The control section 28 includes a CPU, memories, etc. and controls the whole optical disk player 30 on the basis of control programs, which have been previously stored in the memories.

The control section 28 is connected to the data protection means 31, e.g., burn-proof, just link, which interrupts writing data when buffer under-run occurs, so as not to produce useless disks. The data protection means 31 of the present embodiment is an LSI having said function.

The data protection means 31 checks amount of data left in the buffer memory 42. If the amount of data left in the buffer memory 42 is equal to or less than a predetermined value, the data protection means 31 controls the encoder 44, the laser driver 32 and the servo-controlling means 24 so as to interrupt writing data.

When writing data is interrupted, the data protection means 31 checks the amount of data left in the buffer memory 42. If the amount of data left in the buffer memory is greater than the predetermined value, the data protection means 31 restarts to write data.

Further, if writing data cannot be restarted, the data protection means 31 controls the servo-controlling means 24 to make a writing velocity slower so as to restart writing data.

Figure 2:
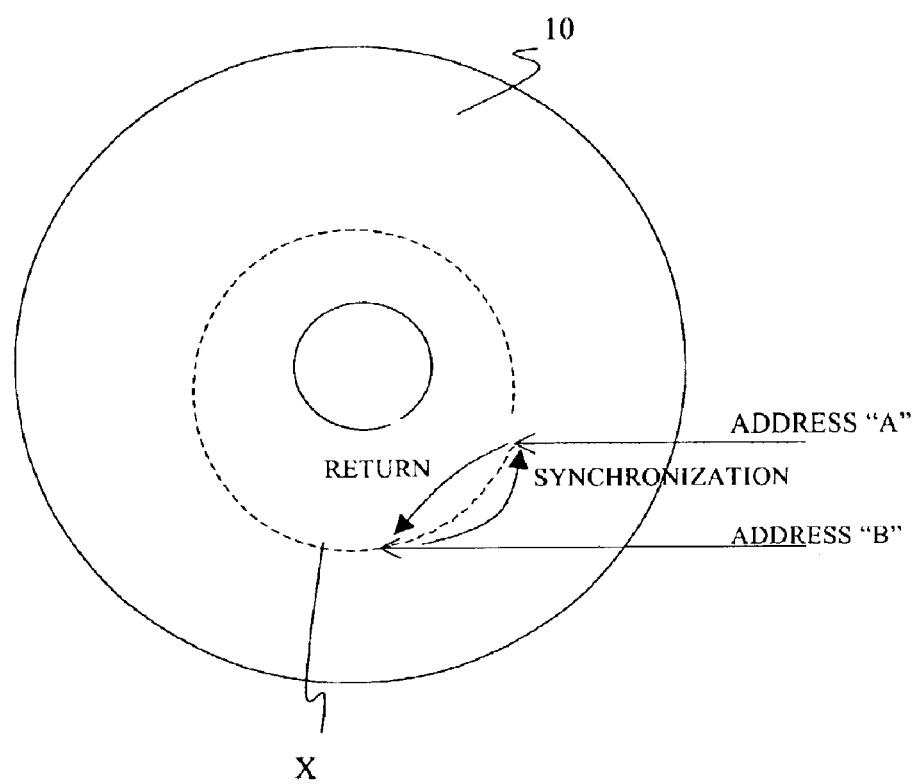
FIG. 2 is an explanation view showing a manner of writing data of the first embodiment.

The action of the data protection means 31 will be explained with reference to FIG. 2.

After the buffer under-run occurs, if a data transferring velocity is accelerated or enough amount of data to be written are stored in the buffer memory, the data protection means 31 controls the servo-controlling means 24 to return or inwardly move the optical pick-up a prescribed distance from an interruption address, at which writing data has been once stopped, along a pregroove "x" of the optical disk 10, in which data have been written. Note that, the prescribed distance is a required distance for making the rotation of the spindle motor 22, which has been disturbed after a jump, stable. It is not a specific distance.

Then, the data protection means 31 controls the servo-controlling means 24 to read written data from a synchronization starting address, to which the optical pick-up 19 has been returned, to the interruption address at a reading velocity, which is equal to the writing velocity before the interruption.

At that time, the RF amplifier 26 extracts EFM signals "g" from signals read by the optical pick-up 19 and sends them to the control section 28.

EFM signals "h" of data to be written are generated and sent to the control section 28 by the encoder 44.

The control section 28 synchronizes a phase of the EFM signals "g" with that of the EFM signals "h". Namely, the optical disk 10 is synchronized.

When the phases of the EFM signals "g" and "h" are synchronized, the data protection means 31 controls the servo-controlling means 24 to restart writing data from the interruption address "A".

In some cases, even if the data protection means 31 controls the servo-controlling means 24 to read written data from the synchronization starting address to the interruption address at the reading velocity equal to the writing velocity before the interruption, EMF data patterns on the optical disk 10 cannot be correctly read and the EMF signals "g" are not extracted. If the writing velocity is too fast, quality of written data are not good, so that the EMF signals "g" can not be extracted. In this case, the data protection means 31 controls the servo-controlling means 24 to read the written data at a reading velocity slower than the writing velocity before the interruption. By this control, the optical disk can be securely synchronized even if the quality of written data are not good.

Note that, the writing velocity of the present embodiment means, for example, a 12× velocity, a 20× velocity, etc.

Successively, the action of the optical disk player will be explained with reference to a flow chart of FIG. 3.

When a write-command is inputted via the host computer 40, the optical disk player 30 starts to write data on the optical disk 10.

At a step S100, if buffer under-run occurs while writing data, the data protection means 31 once stops or interrupts writing data.

At a step S102, the data protection means 31 checks the amount of data left in the buffer memory 42 and checks if writing data can be restarted or not.

If enough amount of data are stored in the buffer memory 42, the data protection means 31 judges that writing data can be restarted, then goes to a step S104.

At the step S104, the data protection means 31 controls the servo-controlling means 24 to return the optical pick-up 19 from the interruption address "A" to the synchronization starting address "B", which is separated the prescribed distance from the interruption address "A".

At a step S106, the data protection means 31 controls the servo-controlling means 24 to read the data written between the synchronization starting address "B" and the interruption address "A". The control section 28 synchronizes the rotation of the optical disk 10 with the writing velocity.

At a step S108, if the synchronization is succeeded, the data protection means 31 goes to a step S110 and controls the servo-controlling means 24 to restart writing data at the synchronized writing velocity.

On the other hand, if the synchronization is failed at the step S108, the data protection means 31 goes to a step S109.

At the step S109, the data protection means 31 controls the servo-controlling means 24 to reduce the writing velocity and try the synchronization again. For example, in the case of writing data at a 32× writing velocity before the interruption, the data protection means 31 tries to synchronize at a 24× writing velocity. If the synchronization is succeeded at the slower writing velocity, e.g., 24× writing velocity, the data protection means 31 goes to the step S110 and controls the servo-controlling means 24 to restart writing data at the synchronized slower writing velocity.

The data protection means 31 repeats reduction of the writing velocity until the synchronization is succeeded. By repeating the reduction of the writing velocity, writing data can be securely restarted.

The method of writing data described above can be applied to not only CLV (Constant Linear Velocity) type optical disk players but also CAV (Constant Angular Velocity) type optical disk players.

(Second Embodiment)

Figure 4:
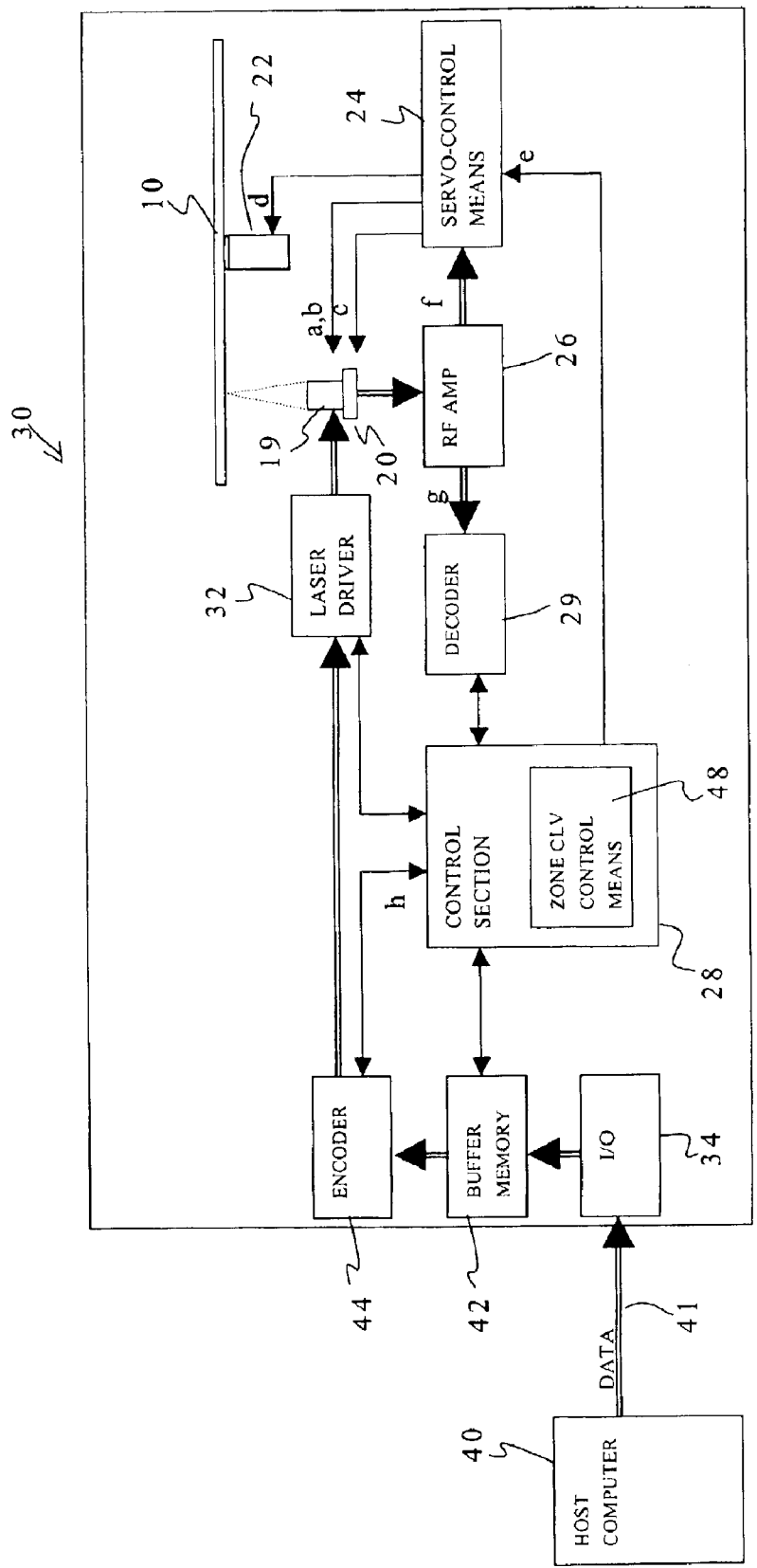
FIG. 4 is a block diagram of an optical disk player of a second embodiment of the present invention.

A structure of an optical disk player of a second embodiment will be explained with reference to FIG. 4. Note that, structural elements described in the first embodiment are assigned the same symbols, and explanation will be omitted.

In the present embodiment, the control section 28 include a zone CLV control means 48. The zone CLV control means 48 controls the servo-controlling means 24 to accelerate the writing velocity, by stages, with outwardly writing data, zone by zone, from an inner zone of the optical disk 10.

The zone CLV control will be explained with reference to FIG. 5.

Figure 5:
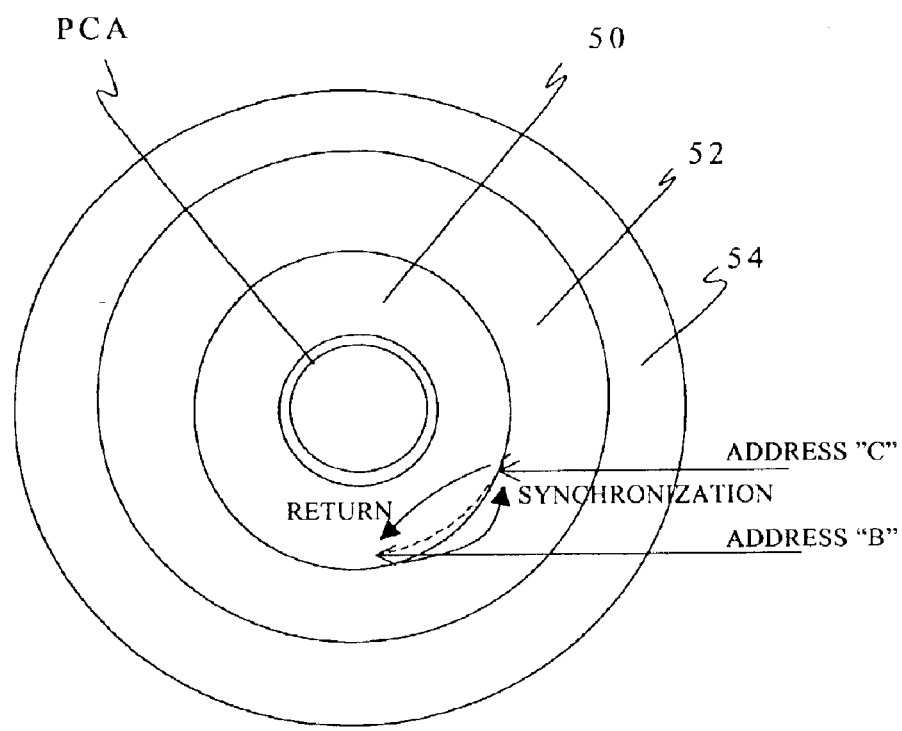
FIG. 5 is an explanation view showing a manner of writing data of the second embodiment.

As shown in FIG. 5, a data writing area of the optical disk 10 is divided into a plurality of zones 50, 52 and 54 in the radial direction. The writing velocity is accelerated, by stages, toward the outermost zone 54. In each zone, data are written at a constant linear velocity.

In the present embodiment, the writing linear velocities are a 16X velocity (zone 50), a 20× velocity (zone 52) and a 24× velocity (zone 54).

Velocity changing addresses, each of which corresponds to a border between the adjacent zones, have been previously calculated on the basis of a known formula. The formula is omitted here, but the calculation is based on characteristic values of the optical disk 10, e.g., track pitch, linear velocities. The formula has been previously stored in a memory (not shown) included in the control section 28.

A manner of calculating the velocity changing address "C" will be explained. Firstly, an optimum power control (OPC) test, which is a data writing test for selecting an optimum laser power, is executed in a power calibration area (PCA), which is the innermost part of the optical disk 10. In the OPC test, the characteristic values for the calculation are measured, then the velocity changing address "C" is calculated on the basis of the values. The calculated address "C" will be stored in a memory (not shown).

Next, the zone CLV control for writing data will be explained.

After writing data is started, if the zone CLV control means 48 detects the optical pick-up 19 reaching the velocity changing address "C" stored in the memory, the zone CLV control means 48 controls the servo-controlling means 24, the encoder 44, etc. so as to once stop or interrupt writing data.

Then, the zone CLV control means 48 controls the servo-controlling means 24 to inwardly move or return the optical pick-up 19 a prescribed distance from the velocity changing address "C", at which writing data has been interrupted, along the pregroove "x", in which data have been written. The returned position is a synchronization starting address "B". Note that, the prescribed distance is a required distance for making the rotation of the spindle motor 22, which has been disturbed after a jump, stable. It is not a specific distance.

Further, the zone CLV control means 48 controls the servo-controlling means 24 to read the written data from the synchronization starting address "B" to the velocity changing address "C" at a reading velocity, which is equal to a predetermined writing velocity of the next zone 52 and which is faster than the writing velocity before the interruption.

At that time, the RF amplifier 26 extracts the EFM signals "g" from signals detected by the optical pick-up 19 and sends the signals "g" to the control section 28.

The EFM signals "h" of data to be written are generated and sent to the control section 28 by the encoder 44.

The control section 28 synchronizes a phase of the EFM signals "g" with that of the EFM signals "h". Namely, the optical disk 10 is synchronized. When the phases of the EFM signals "g" and "h" are synchronized, the zone CLV control means 48 of the control section 48 controls the servo-controlling means 24 to restart writing data from the velocity changing address "C" at the predetermined writing velocity faster than the writing velocity before the interruption.

In some cases, even if the zone CLV control means 48 controls the servo-controlling means 24 to read written data from the synchronization starting address "B" to the velocity changing address "C" at the reading velocity faster than the writing velocity before the interruption, EMF data patterns on the optical disk 10 cannot be correctly read and the EMF signals "g" are not extracted. In this case, the zone CLV control means 48 controls the servo-controlling means 24 to return the optical pick-up to the synchronization starting address "B" again and read the written data at a reading velocity equal to the writing velocity before the interruption. By this control, the optical disk can be securely synchronized even if the writing velocity cannot accelerated at the velocity changing address "C".

Successively, the action of the optical disk player will be explained with reference to a flow chart of FIG. 6.

When a write-command is inputted via the host computer 40, the optical disk player 30 starts to write data on the optical disk 10.

At a step S200, if the optical pick-up 19 writing data reaches the velocity changing address "C" at which the writing velocity will be changed, the zone CLV control means 48 goes to a step S202 and controls the servo-controlling means 24 and the laser driver 32 to interrupt writing data.

At the step S204, the zone CLV control means 48 controls the servo-controlling means 24 to return the optical pick-up 19 from the velocity changing address "C" to the synchronization starting address "B", which is separated the prescribed distance from the velocity changing address "B".

At a step S206, the zone CLV control means 48 controls the servo-controlling means 24 to read the data written between the synchronization starting address "B" and the velocity changing address "C" at a reading velocity, which is equal to the writing velocity of the next zone 52 and which is one-stage faster than the former writing velocity of the zone 50, so as to extract the EFM signals "g". The control section 28 synchronizes the rotation of the optical disk 10 with the writing velocity.

At a step S208, if the synchronization is succeeded, the zone CLV control means 48d goes to a step S210 and controls the servo-controlling means 24 and the laser driver 32 to restart writing data at the synchronized writing velocity.

On the other hand, if the synchronization is failed at the step S208, the zone CLV control means 48 goes to a step S209. At the step S209, the zone CLV control means 48 controls the servo-controlling means 24 to reduce the writing velocity and try the synchronization again.

Then the zone CLV control means 48 goes to the step S210 and controls the servo-controlling means 24 to restart writing data at the former writing velocity.

(Third Embodiment)

Figure 7:
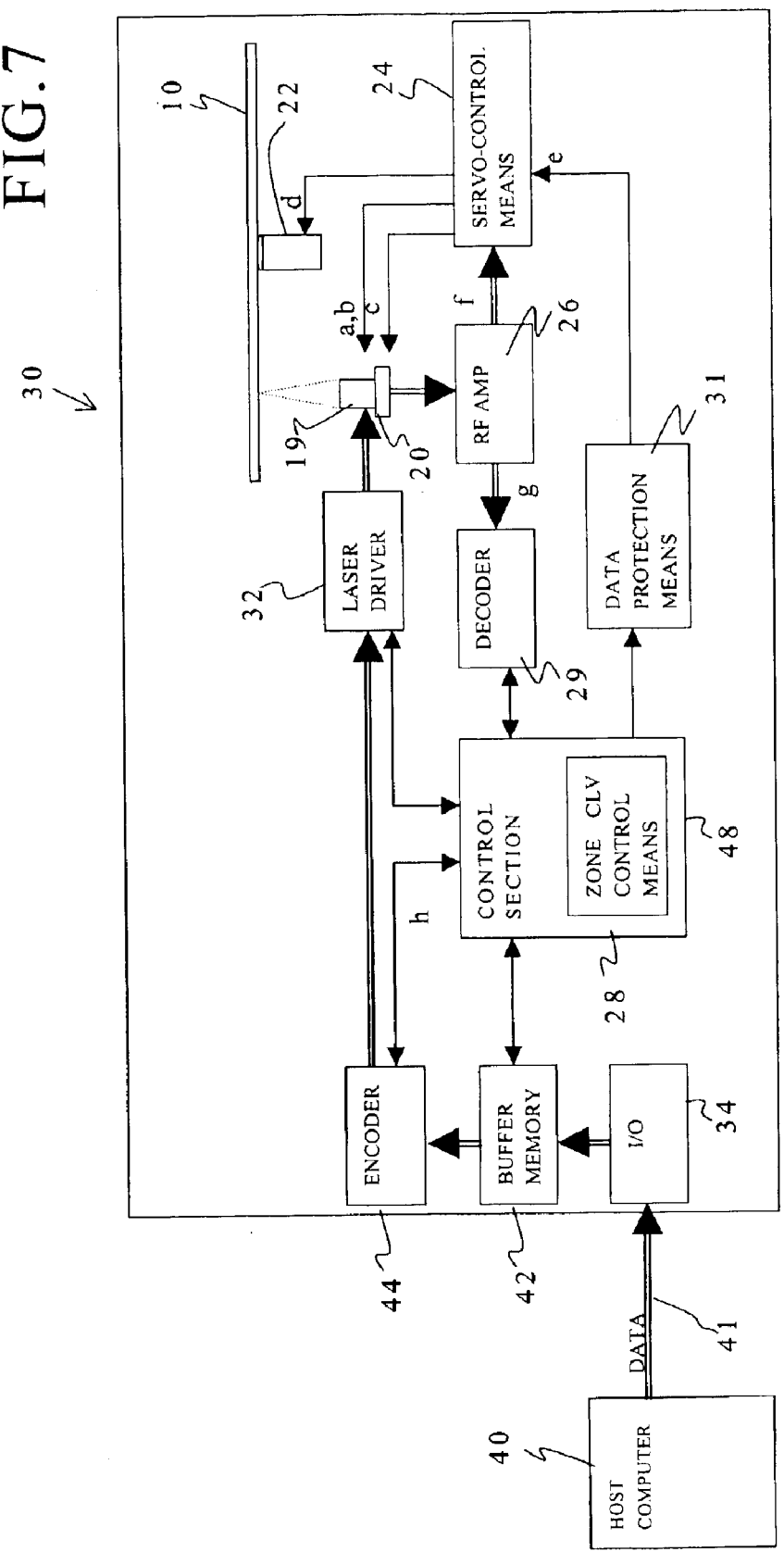
FIG. 7 is a block diagram of an optical disk player of a third embodiment of the present invention.

A structure of an optical disk player of a third embodiment will be explained with reference to FIG. 7. The third embodiment a combination of the first and the second embodiments. Note that, structural elements described in the former embodiments are assigned the same symbols, and explanation will be omitted.

In the present embodiment, the zone CLV control means 48 controls the servo-controlling means 24 to accelerate the writing velocity, by stages, with outwardly writing data, zone by zone, from the inner zone of the optical disk 10. Further, when the buffer under-run occurs, the data protection means 31 interrupts writing data so as not to produce useless disks.

Figure 3:
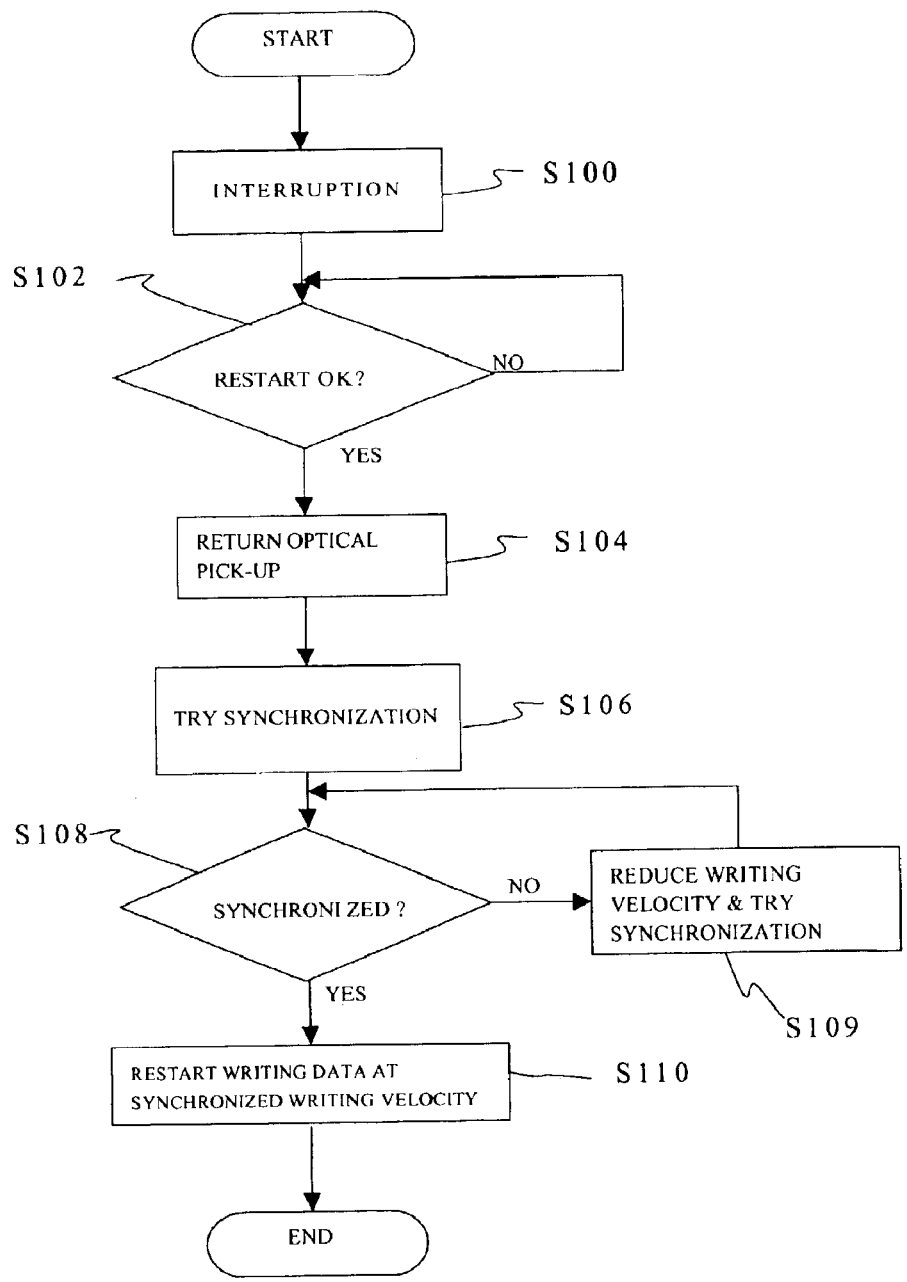
FIG. 3 is a flow chart of writing data of the first embodiment.
Figure 6:
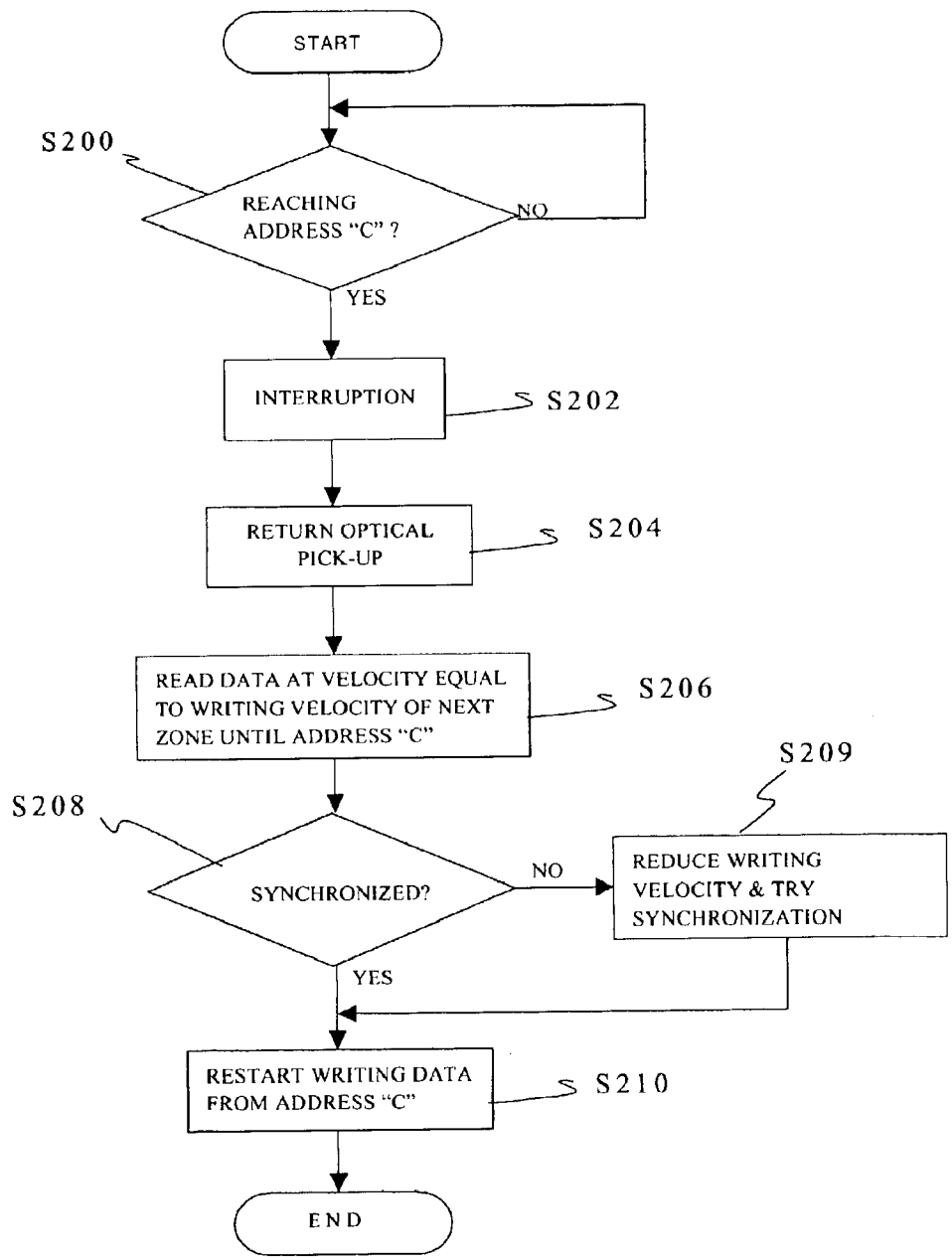
FIG. 6 is a flow chart of writing data of the second embodiment.

In the optical disk player of the third embodiment, the data protection means 31 acts as the flow chart of FIG. 3 so as to protect data; the zone CLV control means 48 acts as the flow chart of FIG. 6 when the writing velocity is changed.

Namely, if writing data is interrupted due to protecting data or changing writing velocities under the zone CLV control, written data are read so as to synchronize. Even if the synchronization is failed, the reading velocity is made slower and synchronized again until the synchronization is succeeded, so that data can be securely written without producing useless disks.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. An optical disk player, comprising:

an optical pick-up irradiating laser beams toward an optical disk while reading data from and writing data on the optical disk, said optical pick-up being moved along a pregroove of the optical disk so as to read data from and write data on the optical disk;

means for moving said optical pick-up so as to read data from and write data on the optical disk;

a spindle motor for rotating the optical disk;

means for servo-controlling said moving means and said spindle motor so as to read and write data at prescribed velocities; and data protection means interrupting to write data when buffer under-run occurs, said data protection means restarting to write data when a data transferring velocity is accelerated or enough amount of data to be written are stored in a buffer memory, in which data are temporally stored before writing, after the interruption of writing data, wherein said data protection means controls said servo-controlling means to inwardly return said optical pick-up from an interruption address, at which writing data has been interrupted, to a synchronization starting address along the pregroove, in which data have been written, said data protection means controls said servo-controlling means to read data from the synchronization starting address to the interruption address at a reading velocity, which is equal to the writing velocity before the interruption, said data protection means controls said servo-controlling means to restart writing data from the interruption address if a phase of data read is synchronized with a phase of data to be written, and said data protection means controls said servo-controlling means to return said optical pick-up to the synchronization starting address and read data from the synchronization starting address to the interruption address at a reading velocity slower than the writing velocity before the interruption so as to synchronize the phase of data read with the phase of data to be written if the phase of data read is not synchronized with the phase of data to be written.

2. The optical disk player according to claim 1, wherein said data protection means repeats the action for synchronizing the phase of data read with the phase of data to be written with reducing the reading velocity between the synchronization starting address and the interruption address until the phases are synchronized.

3. An optical disk player, comprising:

an optical pick-up irradiating laser beams toward an optical disk while reading data from and writing data on the optical disk, said optical pick-up being moved along a pregroove of the optical disk so as to read data from and write data on the optical disk;

means for moving said optical pick-up so as to read data from and write data on the optical disk;

a spindle motor for rotating the optical disk;

means for servo-controlling said moving means and said spindle motor so as to read and write data at prescribed velocities; and zone CLV control means controlling said servo-controlling means so as to change a writing velocity on the basis of zones of the optical disk, in which data are written, wherein said zone CLV control means controls said servo-controlling means to interrupt writing data when an address of written data reaches an velocity changing address, at which the writing velocity is changed, said zone CLV control means controls said servo-controlling means to inwardly return said optical pick-up from the velocity changing address to a synchronization starting address along the pregroove, in which data have been written, said zone CLV control means controls said servo-controlling means to read data from the synchronization starting address to the velocity changing address at a reading velocity, which is equal to a predetermined writing velocity of the next zone and which is faster than the writing velocity before the interruption, said zone CLV control means controls said servo-controlling means to restart writing data from the velocity changing address at the predetermined writing velocity if a phase of data read is synchronized with a phase of data to be written, and said zone CLV control means controls said servo-controlling means to return said optical pick-up to the synchronization starting address and read data from the synchronization starting address to the velocity changing address at the reading velocity, which is equal to the writing velocity before the interruption, so as to synchronize the phase of data read with the phase of data to be written if the phase of data read is not synchronized with the phase of data to be written at the predetermined writing velocity.

* * * * *